United States Patent [19]

Masaaki et al.

[11] 4,428,789

[45] Jan. 31, 1984

[54] PROCESS FOR FIRMLY BONDING A THERMOPLASTIC COVERING SHEET ON A HARD ARTICLE

[75] Inventors: Matsushita Masaaki; Terado Tetsuo, both of Ichihara, Japan

[73] Assignee: UBE Industries, Ltd., Yamaguchi, Japan

[21] Appl. No.: 350,611

[22] Filed: Feb. 22, 1982

[30] Foreign Application Priority Data

Mar. 5, 1981 [JP] Japan ............................... 56-30579

[51] Int. Cl.³ .......................................... B32B 31/20
[52] U.S. Cl. ..................................... 156/85; 156/86; 156/87; 156/285; 156/286
[58] Field of Search ................... 156/85, 86, 87, 285, 156/286, 304.2, 304.6, 583.3, 156; 100/211, 212

[56] References Cited

U.S. PATENT DOCUMENTS

| | | | |
|---|---|---|---|
| 2,411,438 | 4/1947 | Watts | 100/211 |
| 3,235,289 | 2/1966 | Jones | 156/86 |
| 3,276,929 | 10/1966 | Ferch | 156/86 |
| 3,610,291 | 10/1971 | Heslop et al. | 156/86 |
| 4,101,353 | 7/1978 | Watson | 156/86 |
| 4,209,352 | 6/1980 | Diaz et al. | 156/285 |

*Primary Examiner*—Caleb Weston
*Attorney, Agent, or Firm*—Burgess, Ryan & Wayne

[57] ABSTRACT

A process for firmly bonding a thermoplastic covering sheet on a hard article, for example, a steel pipe or cable, comprising wrapping a heat-shrinkable covering sheet having an adhesive layer around a portion of the peripheral surface of a hard article to be protected and heating the covering sheet so as to shrink it, which process is characterized by placing a pressing band on the covering sheet and by creating a pressure in the pressing band, so as to press the covering sheet against the hard article, thereby removing air bubbles formed between the covering sheet and the hard article.

11 Claims, 5 Drawing Figures

PROCESS FOR FIRMLY BONDING A THERMOPLASTIC COVERING SHEET ON A HARD ARTICLE

FIELD OF THE INVENTION

The present invention relates to a process for firmly bonding a thermoplastic covering sheet on a hard article. More particularly, the present invention relates to a process for firmly bonding a thermoplastic covering sheet on the peripheral surface portion of a hard article, which has been prepared by bonding two ends of one or two primary articles together, by pressing the covering sheet against the hard article while removing air bubbles formed between the covering sheet and the peripheral surface of the hard article.

BACKGROUND OF THE INVENTION

It is known that when two ends of one or two hard articles, for example, steel articles or other metal articles, are bonded or welded together, the peripheral surface of the bonded portion of the resultant hard article is covered with a thermoplastic covering sheet so as to protect the bonded portion from corrosion and/or rusting. Especially, in the fields of coated steel pipes, tubes, bars and cables, it is extremely important to completely protect the bonded portion thereof from corrosion and/or rusting by firmly covering the bonded portion with a fluid-impermeable thermoplastic covering sheet.

Also, it is known that, for the purpose of protecting the bonded portion of the hard article, the peripheral surface of the bonded portion should be wrapped with a thermoplastic covering sheet which may be in the form of a tape or tube, and which has an adhesive layer formed on a surface of the sheet, in such a manner that the adhesive layer comes into contact with the peripheral surface of the bonded portion and that the two end portions of the covering sheet on the hard article overlap each other; the overlapping end portions should be temporarily bonded to each other; and the covering sheet should be heated at a high temperature sufficient to cause the covering sheet to shrink, whereby the covering sheet comes into close contact with the peripheral surface of the bonded portion of the hard article and is firmly bonded thereto with the adhesive layer of the covering sheet.

The heating procedure of the covering sheet may be carried out either externally or internally. In the external heating procedure, the covering sheet applied onto the hard article is heated from the outside thereof by using a heater or a gas burner. In the internal heating procedure, an electroconductive heat-generating element is incorporated in the body of the covering sheet, and, after the covering sheet is wrapped around the bonded portion of tbe hard article, an electric current is applied to the heat-generating element.

The above-mentioned conventional covering process is advantageous in that the covering procedure can be completed within a short period of time, and the protecting effect of the covering sheet on the hard article is substantially satisfactory.

However, the above-mentioned conventional covering process is disadvantageous in that undesirable air bubbles are formed between the covering sheet and the surface of the hard article. In the usual application of the covering sheet onto the hard article, the covering sheet is wrapped around the peripheral surface portion of the hard article to be protected, in such a manner that the adhesive layer of the covering sheet faces the peripheral surface portion of the hard article; then, the covering sheet is heated to an extent that the covering sheet shrinks, so that the adhesive layer becomes mobile and comes into close contact with the peripheral surface portion of the hard articles; then the adhesive layer is solidified while the covering sheet presses the hard article under a pressure generated due to the shrinkage thereof. When the covering sheet is wrapped around the hard article, a certain amount of air is retained between the covering sheet and the peripheral surface of the hard article. Usually, the retained air is not completely removed during the heat-fastening procedure of the covering sheet and, thus, air bubbles are formed in the adhesive layer or between the adhesive layer and the peripheral surface of the hard article. The air bubbles cause the bonding strength of the fastened covering sheet to the peripheral surface of the hard article to be unsatisfactory and, therefore, the protecting effect of the covering sheet for the hard article is poor. Accordingly, it is important to remove the air bubbles from between the covering sheet and the bonded portion of the hard article. This removal of the air bubbles is carried out manually by moving a hand or a pressing pad from a central portion of the peripheral surface of the fastened covering sheet toward a side edge portion thereof while pressing the peripheral surface of the covering sheet with the palm of the hand or pressing pad.

The above-mentioned manual removal of the air bubbles is disadvantageous in the following points.

1. A long time period is necessary to complete the removal of the air bubbles.
2. The worker should be skilled in the removing operation.
3. It is difficult to completely remove the air bubbles, especially in the case where the hard article is of a large size, for example, in the case of a large steel pipe for an oil pipe line.

Accordingly, it is desirable to provide a new process for fastening the covering sheet on the peripheral surface portion of a hard article while removing the air bubbles formed therebetween.

SUMMARY OF THE INVENTION

An object of the present invention is to provide a process for firmly bonding a thermoplastic covering sheet on a hard article while removing air bubbles from between the covering sheet and the peripheral surface portion of the hard article.

The above-mentioned object can be attained by the process of the present invention, comprising:

covering a portion of the peripheral surface of a hard article with a heat-shrinkable thermoplastic covering sheet having an adhesive layer; and heating said covering sheet around said hard article at a high temperature sufficient for causing said covering sheet to shrink, whereby said covering sheet becomes fastened on the peripheral surface portion of said hard article, which process is characterized in that the covering sheet on said hard article is wrapped with a pressing hand comprising a hollow belt which is flexible; and during or after said heating procedure, a fluid within the hollow space in said hollow belt is pressurized, whereby said covering sheet is pressed against said hard article.

DETAILED DESCRIPTION OF THE INVENTION

Figure 1:
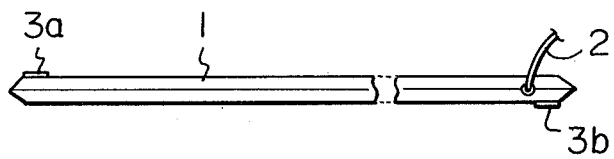
FIG. 1 is a front view of an embodiment of a pressing band usable for the process of the present invention.

In the process of the present invention, a thermoplastic covering sheet, which is capable of shrinking at an elevated temperature, is applied onto a portion of the peripheral surface of the hard article to be protected from corrosion and/or rusting, for example, onto a peripheral surface of a welded portion of a long coated steel pipe. The heat-shrinkable thermoplastic covering sheet comprises a main sheet which has been made from a thermoplastic polymer, for example, polyethylene, polypropylene, polyvinyl chloride, polyester and polyamide, and which may be in the form of a belt, tape or tube, and an adhesive layer formed on a portion of the main sheet surface which comes into contact with the peripheral surface of the hard article when the covering sheet is applied thereto. The main sheet has a natural heat-shrinking property or has a heat-shrinking property incorporated therein. Usually, before or after the procedure for incorporating the heat-shrinking property, a cross-linking procedure is applied to the main sheet, for example, by irradiating electron beams thereto. This cross-linking procedure is effective for increasing the resistance of the main sheet to heat.

In the case where the heating procedure of the heat-shrinkable covering sheet is carried out internally, an electroconductive wire or an electroconductive layer of a polymeric material is incorporated inside or on the surface of the covering sheet, in accordance with a known technology.

The heat-shrinkable thermoplastic covering sheet usable for the process of the present invention is not limited to a special type of heat-shrinkable thermoplastic covering sheet, as long as the covering sheet is shrinkable under a heating condition under which conventional heat-shrinkable sheets are used, to an extent that the shrunk covering sheet becomes fastened on the hard article.

The heat-shrinkable covering sheet of the present invention may be or may not be provided with the above-mentioned electroconductive means for internally heating the covering sheet. The hard article usable for the process of the present invention is not limited to a specific type of article, as long as the article is hard and rigid and does not become deformed under a small pressure. The hard article may be a shaped article, such as a pipe, tube, bar, or rod, which has been prepared by bonding an end of a primary article to an end of another primary article or to the other end of the primary article, and the bonded portion of the article may be covered with the covering sheet. For example, the hard article may be a long steel pipe, tube, bar, or rod or a cable which is coated with a coating layer. Especially, the process of the present invention can be beneficially applied to a long coated steel pipe which has been produced by welding an end of a primary steel pipe to an end of another primary steel pipe, to protect the peripheral surface of the welded portion of the steel pipe. In the process of the present invention, a portion of the peripheral surface of the hard article to be protected is wrapped with the heat-shrinkable covering sheet, and, then, the covering sheet is heated to an elevated temperature sufficient to shrink the covering sheet, so that the shrunk covering sheet is fastened on the hard article.

The covering sheet on the hard article is wrapped with a pressing band comprising a hollow belt which is flexible and is fluid-tight, and during or after the heating procedure is applied to the covering sheet, the fluid within the hollow space of the hollow belt is pressurized. Due to the pressure produced on the fluid in the hollow belt, the covering sheet is pressed against the hard article and the air bubbles formed between the covering sheet and the hard article are removed.

Referring to FIG. 1, a pressing band 1 is provided with a tube 2 connected to an hollow belt, which belt is not shown in FIG. 1. The tube 2 can connect the hollow belt to a supply source (not shown in FIG. 1) of a fluid. The pressing band 1 may be provided with a flat fastener 3a located on an upper surface of an end portion of the pressing band 1 and with another flat fastener 3b located on the lower surface of the opposite end portion of the pressing band 1.

Figure 2:
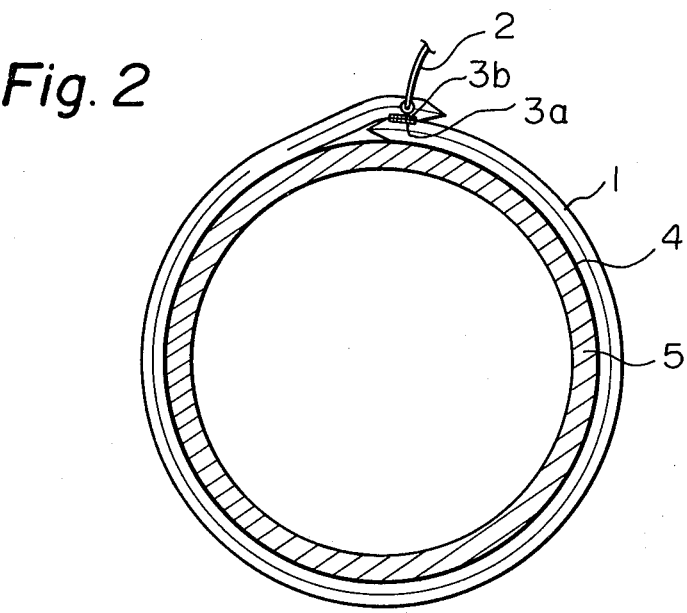
FIG. 2 is a side view of a pipe around which the pressing band, indicated in FIG. 1, is wrapped.

The pressing band 1 as indicated in FIG. 1, can be applied to a covering sheet which has been wrapped around a hard article, for example, in the manner as indicated in FIG. 2.

Referring FIG. 2, a covering sheet 4 is wrapped around a hard article 5, in this case, a pipe, and the pressing band 1 is applied so as to be wrapped around the covering sheet 4 in such a manner that the flat fastener 3a is connected to the flat fastener 3b. The pressing band is temporarily fastened around the covering sheet 4. Under the above-mentioned condition, a pressure is created within the pressing band 1, for example, by blowing air or another inert gas into the hollow tube (not shown in FIG. 2) under pressure, so as to cause the covering sheet 4 to be pressed against the hard article 5.

The pair of flat fasteners 3a and 3b may be replaced by a button, hooks, binding threads, adhesive sheets or other fastening means.

The pressing band usable for the process of the present invention has, as an indispensable element, a hollow belt which has been made of a flexible material and which is completely sealed so that it is fluid-tight, and, optionally, flexible covering belt in which the hollow belt is contained.

Figure 3:
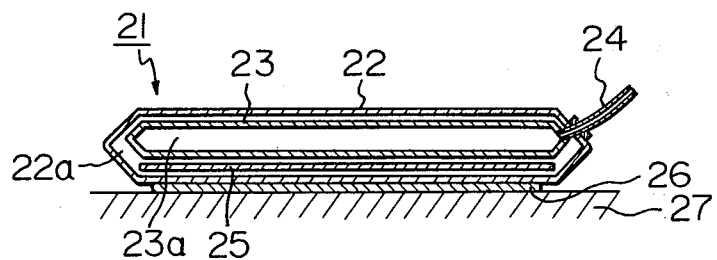
FIG. 3 is an explanatory cross-sectional view of an embodiment of the pressing band usable for the process of the present invention.

Referring to FIG. 3, a pressing band 21 is comprised of a flexible covering belt 22, flexible, fluid-tight hollow belt 23 and a tube 24 connected to the hollow belt 23. The tube 24 is used to supply a fluid into the hollow belt 23. The hollow belt 23 has a hollow space 23a for containing a fluid, which fluid can be pressurized. The covering belt 22 also has a hollow space 22a, for containing therein the hollow belt 23.

The pressing band may be provided with a heat-resistant sheet located on at least a portion of the hollow belt, which portion faces the covering sheet on the hard article when the pressing band is wrapped therearound, to protect the hollow belt 23 from heat.

Referring to FIG. 3 a heat-resistant sheet 25 is located between a lower surface of the hollow belt 23, which will face the covering sheet 26 on the hard article 27 when the pressing band 1 is applied around the covering sheet 26, and the covering belt 22.

In this case, it is preferable that the whole lower surface of the hollow belt be completely protected from heat by the heat-resistant sheet.

The heat-resistant sheet may be located outside of the covering belt so as to protect both the hollow belt and the covering belt from heat.

When a pressure is created in the hollow space 23a in the hollow belt 23, the hollow belt 23 becomes expanded so as to press the covering sheet 26 against the hard article 27.

When the hard article is a coated steel pipe prepared by welding together the end portions of two primary coated steel pipes, the peripheral surface of the welded portion is not even. That is, on the peripheral surface of the welded portion, a protuberance, consisting of welded metal, is formed and a portion of the coating layer is removed so as to create a step. When a covering sheet is applied to the above-mentioned uneven peripheral surface of the welded portion of the steel pipe, it is necessary to evenly press the covering sheet against the uneven surface of the welded portion of the steel pipe. In order to accomplish this, it is preferable that the walls of the hollow belts and, of the covering belt and the heat-resistant sheet be made of a highly flexible (elastic) material. The hollow belt may be preferably made from, for example, a thermoplastic flexible polymer, for example, polyvinyl chloride or polyethylene; a rubber material, for example, natural rubber, ethylene-propylene-termonomer rubber (EPTM), butyl rubber, nitrile rubber butadiene rubber or silicone rubber; or a fluid-proof fabric in which a fabric substrate is coated with a thermoplastic polymer or rubber material, as described above. The fabric substrate may be made from nylon 6 or 66 fibers, cotton fibers, rayon fibers, polyester fibers, acrylic fibers or aromatic polyamide fibers.

The heat-resistant sheet may be preferably made from an asbesto fiber fabric; glass fiber fabric; glass fiber mass; a foam sheet made of a heat-resistant synthetic polymer material or a heat-resistant rubber material or felt; or a woven fabric or non-woven fabric made from heat-resistant fibers.

The heat-resistant sheet, as indicated in FIG. 3, may be omitted. In this case, it is preferable that the portion of the hollow belt, which faces the covering sheet on the hard article when the pressing band is applied thereonto, be made from a heat-resistant material which is preferably flexible and exhibits an excellent heat-insulating property. The above-mentioned type of heat-resistant material may be a rubber sheet or a fabric coated with a rubber material.

The covering belt is effective for protecting the hollow belt from external damage thereof and for preventing excessive expansion thereof. The covering belt may be made of a flexible sheet or net. The flexible sheet may be a synthetic polymer sheet, a rubber sheet, a woven or knitted fabric or a non-woven fabric. It is preferable that the covering belt be made from a heat-resistant material, as described hereinbefore. In this case, the heat-resistant sheet may be omitted.

The pressure in the hollow space of the hollow belt can be created to a desired extent by blowing air, nitrogen gas or other substantially inert gas or by flowing a liquid thereinto, under a desired pressure. Otherwise, the pressure can be created by placing a liquid capable of being easily vaporized in the hollow space of the hollow belt and by vaporizing the liquid, for example, by heating it.

This pressure serves to expand the hollow belt. The expanded hollow belt presses the covering sheet against the hard article so as to remove the air bubbles from between the covering sheet and the hard article.

The degree of pressure to be created in the hollow belt is not limited to a specific value, as long as the created pressure is slightly above atmospheric pressure.

That is, it is preferable that the pressure be controlled within the range of from 1.05 to 1.5 atmospheres.

The pressure may be produced by using a pressurized gas, compressor, air tank, bellows or other conventional pressure-producing means.

Figure 4:
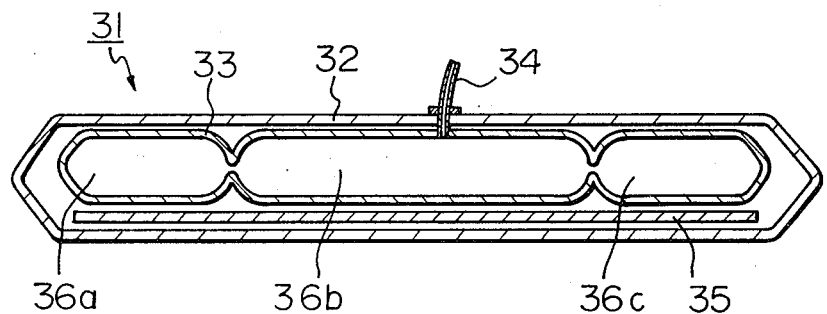
FIG. 4 is an explanatory cross-sectional view of another embodiment of the pressing band usable for the process of the present invention.

The hollow belt may have a single hollow space, as indicated in FIG. 3, or a plurality of hollow spaces which are connected to each other, as indicated in FIG. 4.

Referring to FIG. 4, a pressing band 31 has a covering belt 32, a hollow belt 33, a tube 34 connected to the hollow belt 33 and a heat-resistant sheet 35. The hollow space in the hollow belt 33 is contracted at two locations to form three compartments 36a, 36b and 36c which extend in parallel to each other along the longitudinal axis of the pressing band 31 and which are connected to each other. When a fluid is supplied into the hollow belt 33 under pressure, first the middle compartment 36b is expanded and, then, the side compartments 36a and 36c are expanded.

The number of the compartments is not limited to a specific number. However, it is preferable that the number of the compartments be an odd number, for example, 3 or 5, and that the arrangement of the side compartments be symmetrical with respect to the central compartment.

In the case of a welded coated steel pipe, the welded portion has a protuberance consisting of a welded metal which is formed in the middle of the welded portion, and the non-coated surfaces of the steel pipe are located at both sides of the protuberance and have approximately the same width as each other. The levels of the non-coated surfaces are lower than the level of the peripheral surface of the coated layer on the steel pipe, thereby creating a step between these portions. When a covering sheet is applied to the uneven welded portion of the coated steel pipe, air bubbles are formed mainly on the foot portions of the protuberance and on the foot portions of the steps. In order to effectively remove the air bubbles from the above-mentioned portions, it is preferable that the pressing band be wrapped around the covering sheet on the welded portion, so that the center portion of the central compartment is brought just above the protuberance located in the central portion of the welded portion, and the covering sheet, placed on the welded portion, be uniformly pressed against the welded portion by creating a pressure in the hollow belt, in such a manner that the central compartment is firstly expanded and, then, the side compartments are sequently expanded. By this pressing procedure, the air bubbles are moved from the central portion to both the side end portions of the covering sheet and, then, removed from between the covering sheet and the welded portion.

In another embodiment of the pressing band usable for the process of the present invention, the hollow belt has a plurality of compartments separated from each other, each compartment having an inlet tube for supplying a fluid thereinto. In this case, the degrees of the pressures in the compartments may be different from each other and the pressures in the compartments may be created at different stages from each other, so as to smoothly remove the air bubbles. The application of the pressing band, indicated in FIG. 4, to a covering sheet wrapping a welded portion of a steel pipe is shown in FIG. 5.

Figure 5:
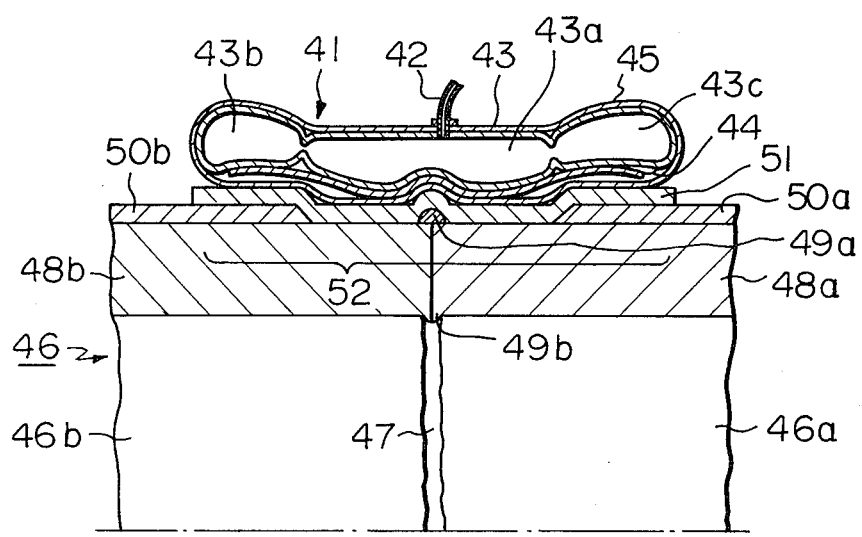
FIG. 5 is an explanatory partial cross-sectional view of a coated steel pipe which has been prepared by welding two primary coated steel pipes together and to which a covering sheet is fastened on the peripheral surface of the welded portion of the pipe.

Referring to FIG. 5, two primary steel pipes 46a and 46b are welded together at a weld 47 to form a steel pipe 46. The cross-sectional profiles of the walls of the primary pipes 46a and 46b are indicated by reference numbers 48a and 48b, respectively. In the weld 47, an outside protuberance 49a and an inside protuberance 49b are formed. The primary pipes 46a and 46b are coated by coating layers 50a and 50b, respectively. Due to the welding procedure, portions of the coating layers 50a and 50b each adjacent the outside protuberance 49a have been removed, so that portions of the peripheral surfaces of the primary pipe 46a and 46b have been exposed to the atmosphere and the remaining coating layers 50a and 50b have each created a step from the exposed surface, respectively.

A covering sheet 51 is applied to the welded portion 52 of the steel pipe 46, so that the welded portion 52 is wrapped with the covering sheet 51. The covering sheet 51 is heated so as to be shrunk and fastened on the welded portion 52. Before or after the heating procedure, a pressing band 41, of the same type as that indicated in FIG. 4, is wrapped around the covering sheet 51 and both ends of the pressing band 41 are temporarily connected to each other in the manner as shown in FIG. 2. The temporary connection is effective for keeping the pressing band at a desired position on the covering sheet during the pressing procedure without being removed from the desired position.

If the pressing band is endless and in the form of an annulus, the annular pressing band is slid over the end of the pipe and brought to the desired position on the covering sheet.

In another method for applying the covering sheet and the pressing band to the welded portion of the pipe, the covering sheet is temporarily placed on a side surface of the pressing band, so as to form a temporary two-layer composite. The temporary composite is placed on the welded portion of the pipe, in such a manner that the covering sheet comes into direct contact with the peripheral surface of the welded portion of the pipe.

Referring to FIG. 5, the pressing band 41 has a hollow belt 43 having a middle compartment 43a and two side compartments 43b and 43c, a fluid supply tube 42 connected to the middle compartment 43a, a covering belt 45 and a heat-resistant sheet 44. The pressing band 41 is placed on the covering sheet 51 on the pipe 46 in such a manner that a center portion of the middle compartment 43a comes above the outside protuberance 49a in the welded portion 52.

The pressing procedure is carried out during or just after the heating procedure is applied to the covering sheet. That is, it is preferable that the pressing procedure be carried out while the covering sheet is kept at an elevated temperature.

In FIG. 5, when a fluid, for example, air, is supplied to the hollow belt 43 under pressure, first, the middle compartment 43a is expanded by the supplied fluid, so that the portion of the covering sheet 51 facing the outside protuberance 49a is pressed. Thereafter, the side compartments 43b and 43c are expanded, so as to press the remaining side portions of the covering sheet 51. By the above-mentioned pressing procedure, the air bubbles are removed from between the covering sheet and the peripheral surface of the welded portion of the pipe.

The pressing procedure is continued until the air bubbles are satisfactorily removed and the covering sheet is firmly fastened to the hard article. Usually, the pressing procedure is carried out for 1 to 20 minutes. The pressing procedure may be carried out in a single operation or in two or more operations. For example, after a first pressing procedure is effected, the pressing band is removed from the covering sheet so as to adjust the temperature of the covering sheet to a desired level, and, then, a second pressing procedure is effected to the covering sheet.

Since the process of the present invention can remove the air bubbles formed between the covering sheet and the peripheral surface of the hard article and can promote firm bonding of the covering sheet to the hard article, the portion of the peripheral surface of the hard article covered by the covering sheet can be completely protected from corrosion and/or rusting. Also, the process of the present invention can be carried out easily without using a special worker highly skilled in the technique.

We claim:

1. A process for firmly bonding a thermoplastic covering sheet to a hard article, comprising:
    covering a portion of the peripheral surface of a hard article with a heat-shrinkable thermoplastic covering sheet having an adhesive layer; and
    heating said covering sheet around said hard article at a high temperature sufficient for causing said covering sheet to shrink, whereby said covering sheet becomes fastened on the peripheral surface portion of said hard article,
    which process is characterized in that the covering sheet on said hard article is wrapped with a pressing band comprising a hollow belt which is flexible; and during or after said heating procedure, a fluid within the hollow space in said hollow belt is pressurized, whereby said covering sheet is pressed against said hard article.

2. The process as claimed in claim 1, wherein said hard article has been prepared by bonding together two end surfaces of one or two primary articles, and said covering sheet is applied to the peripheral surface of the bonded portion of said hard article.

3. The process as claimed in claim 1, wherein said hard article is a long coated steel pipe prepared by welding two end surfaces of two primary steel pipes to each other, and said covering sheet is applied to the peripheral surface of the welded portion of said steel pipe.

4. The process as claimed in claim 1, wherein said hollow belt is covered with a flexible covering belt.

5. The process as claimed in claim 1, wherein said pressing band contains a heat-insulating sheet located on at least a portion of said hollow belt which faces said covering sheet on said hard article when said pressing band is wrapped therearound.

6. The process as claimed in claim 5, wherein said heat-insulating sheet and said hollow belt are covered with a flexible covering belt.

7. The process as claimed in claim 1, wherein at least a portion of said hollow belt, which faces said covering sheet on said hard article when said pressing band is applied to said covering sheet, is made from a heat-resistant sheet.

8. The process as claimed in claim 1, wherein said fluid which creates said pressure in said hollow belt is air or another substantially inert gas.

9. The process as claimed in claim 1, wherein said pressure is created by supplying said fluid into said hollow belt under pressure.

10. The process as claimed in claim 1, wherein said pressure is in the range of from 1.05 to 1.5 atmospheres.

11. A process for firmly bonding a thermoplastic covering sheet to a hard article, comprising:

surrounding a portion of the peripheral surface of a hard article with a heat-shrinkable thermoplastic covering sheet having an adhesive layer;

heating said covering sheet around said hard article at a high temperature sufficient for causing said covering sheet to shrink, whereby said covering sheet becomes secured to the peripheral surface portion of said hard article, wrapping said covering sheet on said hard article with a pressing band comprising an elastic hollow belt;

during or after said heating step introducing pressurized fluid within said hollow belt to cause said belt to expand and press said covering sheet against said hard article, said belt having a longitudinally oriented central hollow compartment and a longitudinally oriented lateral hollow compartment on said side of said central compartment, said pressurized fluid being introduced into said central compartment and thereafter being introduced into said lateral compartments, so that any air trapped between said covering sheet and said hard article is pressed out laterally of said belt.

* * * * *